United States Patent
Bartoshesky et al.

[11] Patent Number: 5,860,662
[45] Date of Patent: Jan. 19, 1999

[54] BICYCLE TO TANDEM CONVERTER

[76] Inventors: Thomas A. Bartoshesky; Hollis E. Dayton, 3909 Earhart Rd., both of Ann Arbor, Mich. 48105

[21] Appl. No.: 847,010

[22] Filed: May 1, 1997

[51] Int. Cl.⁶ .................................................. B62K 27/00
[52] U.S. Cl. ......................... 280/204; 280/231; 280/239; 280/292; 280/30
[58] Field of Search ...................................... 280/239, 231, 280/204, 282, 292, 30, 491.5, 492, 503, 495; 403/83, 110, 319, 373, DIG. 4

[56] References Cited

U.S. PATENT DOCUMENTS

| | | |
|---|---|---|
| 305,690 | 9/1884 | Humber . |
| 552,907 | 1/1896 | Jakobson . |
| 579,982 | 4/1897 | Jakobson . |
| 598,872 | 2/1898 | Hunt . |
| 658,406 | 9/1900 | Straub . |
| 1,300,343 | 4/1919 | Carswell ................................. 280/7.16 |
| 1,539,474 | 5/1925 | Falk ....................................... 280/503 |
| 1,694,278 | 12/1928 | Nordgren ................................ 280/503 |
| 2,271,255 | 8/1942 | Du Bois . |
| 2,756,069 | 7/1956 | Manngarn . |
| 3,387,859 | 6/1968 | Mc Clellan . |
| 3,653,678 | 4/1972 | Howard . |
| 4,261,592 | 4/1981 | Busseuil . |
| 4,274,649 | 6/1981 | Vanderhorst et al. . |
| 4,458,908 | 7/1984 | Strong . |
| 5,067,738 | 11/1991 | O'Connor . |
| 5,076,600 | 12/1991 | Fake . |
| 5,165,762 | 11/1992 | Phillips ................................. 301/110.5 |
| 5,372,371 | 12/1994 | Larson .................................. 280/7.16 |
| 5,470,088 | 11/1995 | Adams . |
| 5,522,610 | 6/1996 | Teel . |
| 5,673,925 | 10/1997 | Stewart ................................. 280/279 |

FOREIGN PATENT DOCUMENTS

| | | | |
|---|---|---|---|
| 873105 | 6/1942 | France ................................. 280/204 |
| 1091332 | 4/1995 | France . |
| 185820 | 8/1936 | Switzerland . |
| 1756196 | 9/1992 | U.S.S.R. . |
| 422768 | 1/1935 | United Kingdom .................. 280/204 |

OTHER PUBLICATIONS

Cyclemate, Popular Science, September 1994.

*Primary Examiner*—Ann Marie Boehler
*Assistant Examiner*—Michael Cuff
*Attorney, Agent, or Firm*—Saidman DesignLaw Group

[57] ABSTRACT

A coupler for coupling two standard bicycles together to form a tandem tricycle. The coupler includes a clamp for clamping the coupler to one of the tines of the seat stays of the leading bicycle and further includes a quick release clamp for releasably gripping one of the tines of the front fork of the trailing bicycle. The quick release clamp is rotatable about a transverse axis relative to the clamp, so the trailing bicycle is likewise rotatable about a transverse axis relative to the leading bicycle. This permits the trailing bicycle to pitch independently of the leading bicycle, thereby allowing the two bicycles to smoothly traverse uneven terrain.

11 Claims, 2 Drawing Sheets

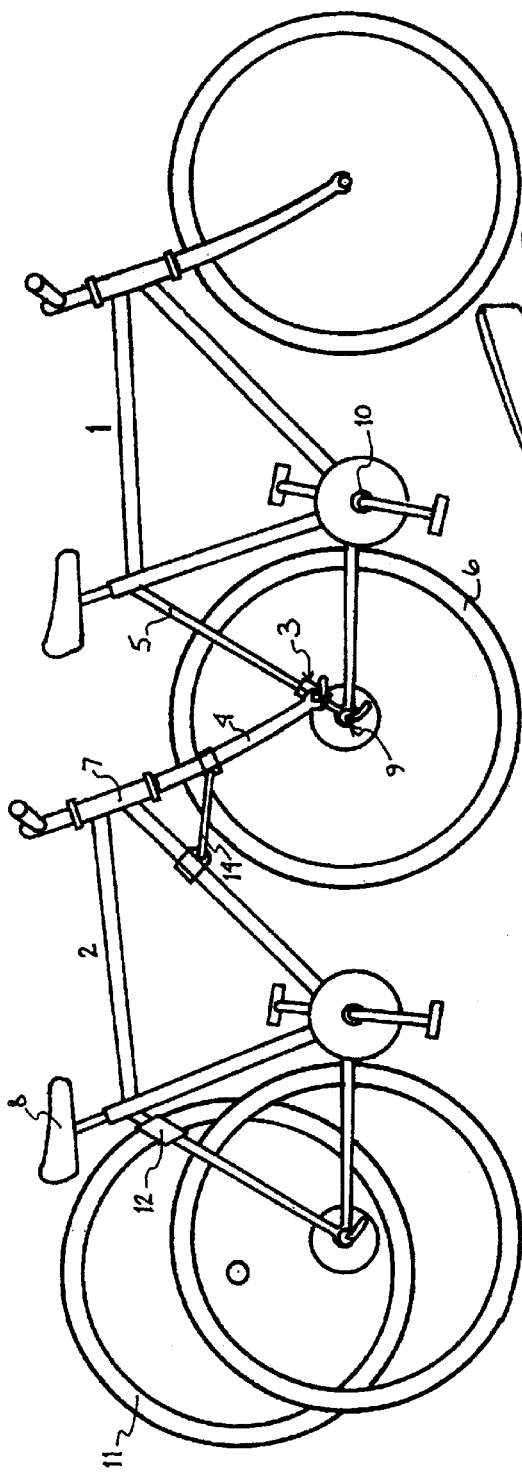
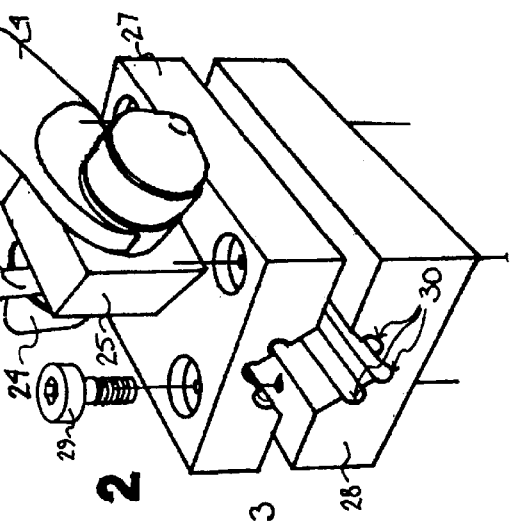

BICYCLE TO TANDEM CONVERTER

BACKGROUND OF THE INVENTION

1. Field of The Invention

This invention relates to the field of bicycles, tandem tricycles, and to bicycle accessories. Specifically, the present invention is an attachment that enables the rapid conversion of two standard two-wheeled, single rider bicycles into one double rider, three in-line wheeled, tandem tricycle.

Two problems arise when touring or simply riding in groups of two or more cyclists. First, it is difficult to speak to fellow riders while maintaining a safe distance. Second, riders often become separated due to differences in fitness, cycling capability, and equipment. Tandem bicycles, i.e., the well known two-wheeled, bicycle-built-for-two, overcome these problems for two riders. Tandems also have the advantage of increased speed as a result of reduced drag as compared to two individual bicycles. However, tandems are expensive, difficult to store, and can only accommodate two cyclists. Tandems also do not offer the individual freedom and maneuverability of a solo bicycle. It is desirable to be able to enjoy the benefits of each at a moment's notice, by being able to switch from a single rider bicycle to a double rider tandem, and vice versa, easily and economically. Two or more people could then cycle to a destination, linked together, conversing easily on the way, and arrive together, regardless of their respective pedaling speeds. Upon arrival, they would have the option of remaining in tandem or of detaching their bicycles and enjoying the advantages of solo cycling on individual bicycles.

The present invention therefore relates to an accessory which would allow two or more conventional bicycles to be quickly and easily linked together to create a tandem and which would allow the reverse to be accomplished in the same manner.

2. Description of Related Art

The desire for a tandem relationship between riders without the necessity of buying and storing a conventional tandem bicycle has been around for a long time. Inventions therefor have taken various styles and constructions. They can be roughly grouped in three classes: trailers, major reconstructions, and adapted bicycles.

In the most rudimentary tandems, the trailing vehicle is merely towed, and the trailing person is no more than a spectator, inasmuch as there is no motive power, pedals, etc., provided for the trailing vehicle. The trailers are attached by some sort of trailer hitch to either the seat posts, the seat stays, or the chain stay of the lead bicycle, or the equivalent elements on a motor scooter or motorcycle. Typical of this class are the British patent to Gyro et al, 422,768, 1-1935, the French patent to Picot, 873,105, 6-1942, the French patent to Passera et al., 1,091,332, 4-1955, and the U.S. Pat. Nos. to Manngarn (2,756,069), Mc Clellan (3,387,859), Howard (3,653,679), Vanderhorst et al. (4,274,649), and Fake (5,076,600).

A second class of tandem tricycles provides a motive means for the trailing vehicle. The trailing vehicle resembles a bicycle, but is either a major modification thereof, such as by a complete removal of the trailing bicycle's handlebars, front fork, and front wheel, or a reconstruction thereof by manufacturing a special bicycle, in reality a monocycle, since it has but one wheel. Usually they are attached to the leading bicycle's seat post or seat post housing by an elongated frame member. Representative of this class are the U.S. Pat. Nos. to Humber (305,690), Jakobson (552,907), O'Connor (5,067,738), and Adams (5,470,088), and the Swiss patent to Fritschi, 185,820, 8-1936. The U.S. Pat. No. to Du Bois (2,271,255), and the Soviet Union patent 1,756, 196, 9-1992, add a structural brace between the frame of the trailing monocycle and the leading bicycle's rear axle.

Finally, there are the various tandem tricycles comprising two almost-conventional bicycles, in which the front fork of the trailing bicycle is attached to the rear axle of the leading bicycle. This class is characterized by the necessity to modify the rear axle and/or the front fork. The standard rear axle is either replaced by a longer one in order to permit mounting of the front fork thereon [e.g., Hunt (598,872), Straub (658,406), Strong (4,458,908), and Teel (5,522,610)] or an extension is attached to the rear axle to accommodate the front fork [e.g., Larson (5,372,371)]. Tandem tricycles which attach the trailing bicycle to the rear axle of the leading bicycle have to cope with the fact that the rear wheel axle mechanism includes the gear transmission, e.g., a derailleur, which makes the rear fork and rear wheel axle bigger and wider than the front wheel fork and axle. To compensate therefor, the front fork is replaced with a modified fork, wider than the original fork, and specially formed to fit around the leading bicycle's transmission (Strong, Larson, and Teel, supra, are examples). Both of these modifications are undesirable. Axle extensions are potentially hazardous, particularly during trail or mountain biking. Further, any modification of the front fork assembly is costly and thereafter requires a complementary modification of the front wheel used therewith.

Jakobson (579,982), and Carswell (1,300,343) retain unchanged the conventional leading bicycle's rear axle and the trailing bicycle's front fork. Instead of modifying them, they provide an adapter which is rotatably mounted for limited movement on the leading bicycle's rear axle and which is rotatably attached to the front fork of the trailing bicycle. Their solutions were acceptable for single speed bicycles but will not likely work on modern multi-speed bicycles. Also, although neither Jakobson nor Carswell mentioned it, attachment of their adapters would seem to require longer rear axles, with the concomitant disadvantage mentioned before.

There are other examples of conversions of two bicycles into a tandem, but they embody isolated concepts. For example, Busseuil (4,261,592) attaches a tow bar between the two bicycles, producing a four-wheeled tandem which each cyclist steered independently.

There remains a need, therefore, for a means whereby two standard single rider, multi-speed bicycles can be rapidly converted into a single tandem tricycle without major, costly modifications to either bicycle. The present invention satisfies that need.

OBJECTS AND SUMMARY OF THE INVENTION

The present invention overcomes the difficulties described above by providing an attachment, i.e., an adapter, coupler, or coupling means, which is attached to each of the tines of the seat stays, above the rear axle, of the leading bicycle. Each coupler includes a horizontal, rotatable axle on which the front fork of the trailing bicycle is mounted, permitting the two bicycles to pitch relative to each other, so that they can ride over uneven terrain, and a vertical, rotatable connection providing a means of successfully applying the couplers to a variety of sizes and shapes of conventional bicycles.

An object of the invention is to provide a simple, economical, and easy to use attachment permitting virtually any two conventional bicycles to be converted into a tandem tricycle.

An additional object of the invention is to provide means for converting two standard bicycles into a tandem tricycle without modification of either bicycle other than to remove one of the front wheels.

BRIEF DESCRIPTION OF THE DRAWINGS

The foregoing and other objects, aspects, uses, and advantages of the present invention will be more fully appreciated as the same becomes better understood from the following detailed description of the present invention when viewed in conjunction with the accompanying drawings, in which:

FIG. 1 is a schematic elevational view of two bicycles coupled together to form a tandem tricycle;

FIG. 2 is a perspective view of a preferred embodiment of the coupling means of the present invention.

DETAILED DESCRIPTION OF THE PREFERRED EMBODIMENT

Figure 3:
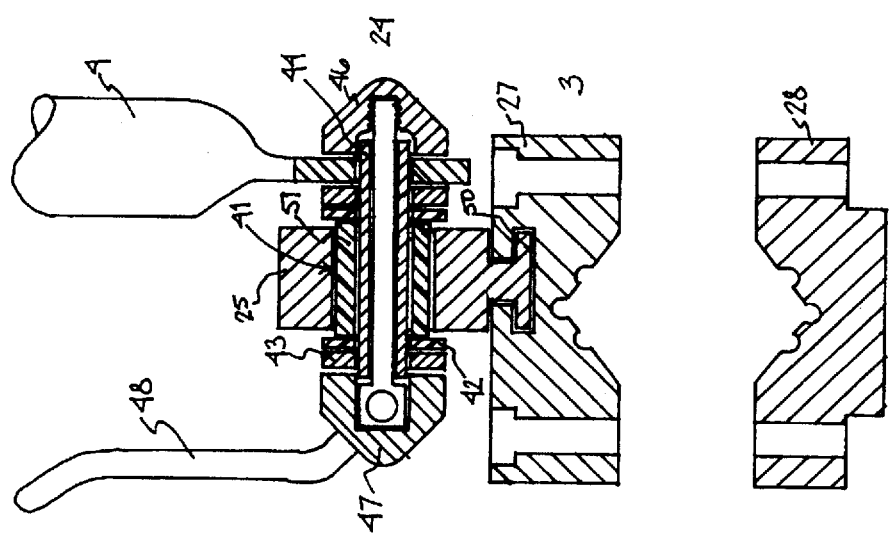
FIG. 3 is a cross-sectional side view of the coupling means of FIG. 2 with one of the pieces shown in both side view and rotated 90°.

Referring to FIG. 1, a tandem tricycle 10 is depicted in a schematic elevational view and comprises two standard bicycles 12 and 14 coupled together. The frame of the leading bicycle 12 comprises a front triangle comprising frame members 16, 18, and 20, which are rigid and integral with a head 22 and a pair of rear triangles (one hidden behind the other in FIG. 1), each of which comprise frame member 18, a seat stay 24, and a chain stay 26. A steering mechanism 28, rotatably mounted to head 22, comprises handlebars 30, a front fork 32, and a wheel 34. A seat 36 and a seat post 38 are telescopically mounted within frame member 18. A pedal and sprocket mechanism 40 is provided to drive a rear wheel 42 via a transmission 44 and the usual chain (not shown for the sake of clarity). Both wheels 34 and 42 are preferably equipped with quick release hubs, indicated schematically at 46 on rear wheel 42.

The trailing bicycle 14 as shown is identical with leading bicycle 12, but it could just as easily be any other standard bicycle. Trailing bicycle 14 comprises the same elements as leading bicycle 12 which are referenced by the same numerals incremented by 100.

Trailing bicycle 14 is shown with its front wheel 134 removed and stored on the hidden seat stay 124 by means of a suitable bracket 148. Trailing bicycle 14 is coupled to leading bicycle 12 by attaching front forks 132 to a preferred embodiment of the present invention, referred to as a coupling means and indicated generally by reference numeral 200. As will become more apparent from the following detailed description of FIGS. 2 and 3, coupling means 200 comprises a pair of couplers 202 (not shown in FIG. 1) which are attached respectively to the two seat stays 24 of leading bicycle 12 a few inches above rear axle 50 of leading bicycle 12. Prior art conversions which attached the trailing bicycle to the rear axle of the leading bicycle added the trailing bicycle's weight to the rear wheel of the leading bicycle, which placed undue strain on the driving and braking mechanisms of the leading bicycle. Those prior art conversions which attached the trailing bicycle aft of the rear axle of the leading bicycle [Jakobson ('982) and Carswell, supra] could cause loss of control by reducing the weight on the front wheel of the leading bicycle. By fixing the couplers 202 of the present invention forward and above rear axle 50, a better weight distribution is effected and the over-all length of tandem 10 is shortened, both of which improve stability and maneuverability of tandem 10. Also, coupling the bicycles above transmission 44 of the leading bicycle 12 eliminates the necessity for longer rear axles, axle extenders, or modified front forks, because the coupling does not interfere with the drive train of leading bicycle 12.

An optional pair of braces 152 may be affixed respectively to frame 120 and the two tines of front fork 132 in order to provide additional stability of trailing bicycle 14 by restricting or eliminating yaw movement of trailing bicycle 14 relative to the long axis of tandem 10. Preferably, braces 152 comprise two posts that connect to and extend from the two tines of front fork 132 and attach to frame 120 of trailing bicycle 14. These braces could optionally contain shock absorbers to dampen oscillation of trailing bicycle 14 relative to leading bicycle 12.

A preferred embodiment of a coupler 202 is shown in perspective in FIG. 2 and in cross-section in FIG. 3. Since couplers 202 are identical or are mirror images, only one need be shown and described in detail.

Referring to FIGS. 2 and 3, coupler 202 includes a pair of blocks 204 and 206 which clamp one of the tines of seat stays 24 between a pair of facing contoured surfaces 208 and 210 respectively formed in blocks 204 and 206. This clamping occurs when blocks 204 and 206 are joined together by means of screws 212 (only one shown for clarity of drawing), each passing through smooth bores 214 and 215 in blocks 206 and 204, respectively, and threaded into nuts 216 captured in complementary-shaped cavities 217 at the end of smooth bores 215 in block 204. A plurality of channels 218 are preferably provided in faces 208 and 210 in order to provide clearance for the usual bicycle cables (not shown) which are routed along seat stays 24.

A housing 220 is shown in perspective in FIG. 2 and cross-sectionally in both a side view and a top view in FIG. 3. Housing 220 is rotatably connected to block 206 by a bolt 221 (FIG. 2) to allow a limited amount of swivel motion between housing 220 and block 206. Bolt 221 passes through smooth bore 222 in housing 220 and is threaded into block 206. Smooth bore 222 includes a pair of enlarged recesses to receive, respectively, head 223 of bolt 221 and a circular nub 224 integral with block 206, so that bolt 221 does not protrude above housing 220, which could be hazardous, and nub 224 positively guides housing 220's swivelling movements. Housing 220 includes a transverse cylindrical bore 225 (FIG. 3) which receives a floating quick release mechanism 226 coaxially therethrough (FIG. 3. top view).

Floating quick release mechanism 226 comprises a centrally located rod 228, threaded at one end to a quick release cap 230, and pinned at 232 to a quick release cam cap 234 and to an actuating arm 236. A hollow threaded axle 238 is concentrically and rotationally received on rod 228 and is itself axially threaded through a bushing 240 that snugly passes through bore 225. Bushing 240 is captured in bore 225 by washers 242 and nuts 244, the latter of which are threaded on axle 238. Bushing 240 is slightly longer axially than bore 225 and washers 242 are held firmly in place against the opposite ends of bushing 240 to provide a clearance 248 between each washer 242 and the adjacent edge of housing 220, i.e., neither washer 242 is pressed against an edge of housing 220. By not gripping housing 220, washers 242 permit bushing 240, axle 238, and quick release mechanism 226 to float within bore 225 and to rotate relative to the housing 220, but they prevent any significant movement left or right along the longitudinal axis of hollow threaded axle 238. Bushing 240 may be made of brass with or without ball bearings or a self-lubricating plastic, such as Teflon or Delrin, or can be a combination thereof.

One of the front tines of fork 132 of the trailing bicycle 14, shown fragmentally in FIGS. 2–3, is securely clamped by quick release mechanism 226 on axle 238 between nut 244 and quick release cap 230. Quick release mechanism 226 and bushing 240 both rotate relative to housing 220, which is essentially fixed relative to leading bicycle 12, allowing the two bicycles 12 and 14, to pitch independently of one another. That is, trailing bicycle 12 can rotate relative to leading bicycle 12 about a horizontal axis through couplers 202. As the three wheels 34, 42 and 142 sequentially traverse uneven terrain, each wheel rises and falls essentially independently of the other two. This is necessary in an in-line tandem tricycle to prevent the middle wheel from leaving the ground over depressions, thereby losing traction, or from becoming a fulcrum for tandem tricycle 10 to see-saw about when crossing elevations.

Bore 225 of each coupler 202 is machined at such an angle to the vertical axis of bolt 221 that when both couplers are properly mounted on seat stay 24, axles 238 of both couplers align with each other, perpendicular to the plane of the leading bicycle. The swivelling of housing 220 about bolt 221 also contributes to properly aligning both axles 238, when coupling together differently sized bicycles. Consequently, by proper adjustments, the plane of the trailing bicycle can be made coincident with the plane of the leading bicycle.

In use, a coupler 202 is clamped onto each tine of the seat stays 24 of the leading bicycle 12 at the appropriate distance from rear axle 50. The front wheel 134 of the trailing bicycle 14 is removed and stored. Each tine of the front fork 132 is then clamped on axle 238 of a respective coupler 202, and the tandem tricycle is ready to go. Because of the use of a quick release mechanism on front wheel 134 and on both couplers 202, no tools are required and the entire process is accomplished as easily and as quickly as removing and replacing a front wheel of a bicycle having a quick release hub. The sole expense is a pair of couplers, and the sole modification required is the proper placement of the couplers on the seat stays. No modifications of the structure of conventional bicycles are necessary in order to effect the conversion, so any two conventional bicycles can be made tandem. If desired, couplers 202 can be permanently affixed to two or more bicycles, so that any individual bicycle in a train of bicycles can be quickly and easily promoted to leader of the pack.

The utility of couplers 202 is not limited to tandem tricycles. They can be used in any environment where two structures need to be quickly clamped together for relative rotational movement, e.g., in the case of a bicycle trailer.

It is clear from the above that the objects of the invention have been fulfilled. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention as defined in the appended claims.

Further, the purpose of the following Abstract is to enable the U.S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention .of the application, which is measured solely by the claims, nor is intended to be limiting as to the scope of the invention in any way.

It can be seen from the above that an invention has been disclosed which fulfills all the objects of the invention. It is to be understood, however, that the disclosure is by way of illustration only and that the scope of the invention is to be limited solely by the following claims.

We claim as our invention:

1. A tandem tricycle, comprising:
   a first bicycle including a frame with a rear triangle including seat stays and a rear wheel with a rear axle mounted on said rear triangle;
   a second bicycle including a front fork with the front wheel removed; and
   coupling means for rotationally coupling said front fork of said second bicycle to said seat stays of said first bicycle, said coupling means comprising clamping means for removably clamping said coupling means to said seat stays above said rear axle and gripping means for removably gripping said front fork.

2. The tandem tricycle of claim 1 wherein said seat stays comprise a first pair of tines, said front fork comprises a second pair of tines, and said coupling means includes a pair of couplers, each of said couplers comprising said clamping means for removably clamping said each coupler to one of said first pair of tines, and each of said couplers further comprising said gripping means, and said gripping means comprising a quick release means for removably gripping one of said second pair of tines, said quick release means being rotatable relative to said clamping means.

3. The tandem tricycle of claim 2 wherein each of said couplers further includes a housing connected to said clamping means, said housing having a transverse cylindrical bore therethrough, said quick release means being rotatable within said transverse bore.

4. The tandem tricycle of claim 3 wherein said housing includes swivel means which rotatably connects said housing to said clamping means about a swivel axis orthogonal to the axis of said transverse bore.

5. A tandem tricycle, comprising:
   a first bicycle including a frame with a rear triangle including seat stays, said seat stays comprising a first pair of tines, and a rear wheel with a rear axle mounted on said rear triangle;
   a second bicycle including a front fork, said front fork comprising a second pair of tines; and
   coupling means for rotationally coupling said front fork of said second bicycle to said seat stays of said first bicycle, said coupling means comprising a pair of couplers, each of said couplers comprising clamping means for removably clamping said each coupler to one of said first pair of tines, and a quick release means for removably gripping one of said second pair of tines, said quick release being rotatable relative to said clamping means;
   a housing connected to said clamping means, said housing including a transverse cylindrical bore therethrough with said quick release means being rotatable within said transverse bore, said housing further including swivel means for rotatably connecting said housing to said clamping means about a swivel axis orthogonal to the axis of said transverse bore; and
   said quick release means comprising a bearing means rotatable in said transverse bore, a hollow axle having nut means threaded thereon for clamping said axle to said bearing means, and a rod rotatable in said hollow axle, said rod having a quick release cap threaded thereto at one end and having a cam cap and actuating arm integrally pinned thereto at the other end, one of said second pair of tines being fixedly gripped between said quick release cap and said nut means when said actuating arm and said cam cap are turned to tighten said quick release means.

6. The tandem tricycle of claim 5 wherein said bearing means is axially longer than said transverse bore and said nut means comprises a washer and nut threaded against each end face of said bearing means, thus providing a gap between said washers and the confronting edges of said housing, whereby said quick release means floats within said transverse bore.

7. A quick release coupler, comprising:

clamping means for removably clamping said coupler to a first structure, and a quick release means for removably gripping a second structure, said quick release means comprising gripping means for gripping said second structure and cam means for operating said gripping means between gripping and releasing said second structure, said cam means comprising a cam surface controlled by an actuating arm, and said quick release means being rotatably coupled to said clamping means.

8. The quick release coupler of claim 7 further including a housing connected to said clamping means, said housing having a transverse cylindrical bore therethrough, and said quick release means being rotatable within said transverse bore.

9. A quick release coupler, comprising:

clamping means for removably clamping said coupler to a first structure, a housing connected to said clamping means, said housing having a transverse cylindrical bore therethrough, and a quick release means for removably gripping a second structure, said quick release means being rotatable within said transverse bore, and thereby said quick release means being rotatable relative to said clamping means, said quick release means comprising bearing means rotatable in said transverse bore, a hollow axle having nut means threaded thereon for fixing said axle to said bearing means, and a rod rotatable in said hollow axle, said rod having a quick release cap threaded thereto at one end and having a cam cap and actuating arm integrally pinned thereto at the other end, said second structure being fixedly gripped between said quick release cap and said nut means when said actuating arm and said cam cap are turned to tighten said quick release means.

10. The quick release coupler of claim 9 wherein said bearing means is axially longer than said transverse bore and said nut means comprises a washer and nut threaded against each end face of said bearing means, thus providing a gap between said washers and the confronting edges of said housing, whereby said quick release means floats within said transverse bore.

11. The quick release coupler of claim 10 wherein said housing includes a swivel which rotatably connects said housing to said clamping means about a swivel axis orthogonal to the axis of said transverse bore.

* * * * *